Patented June 26, 1923.

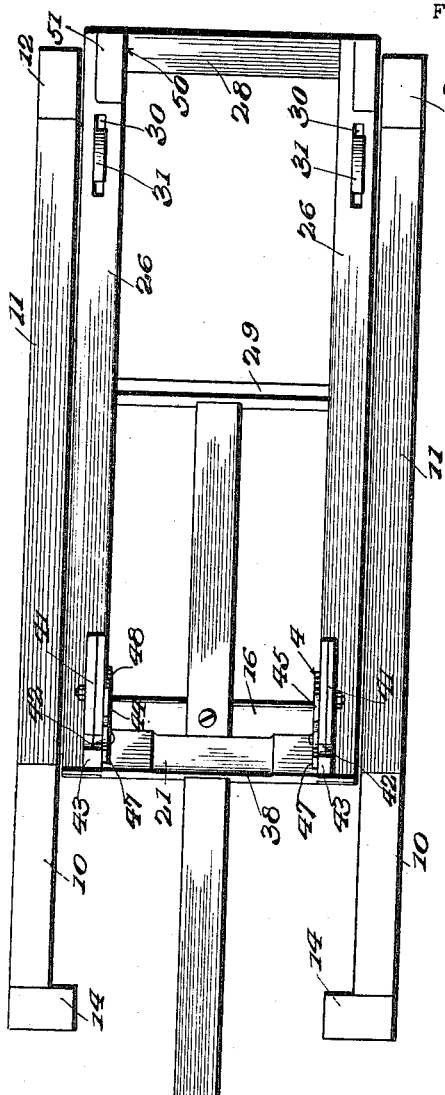

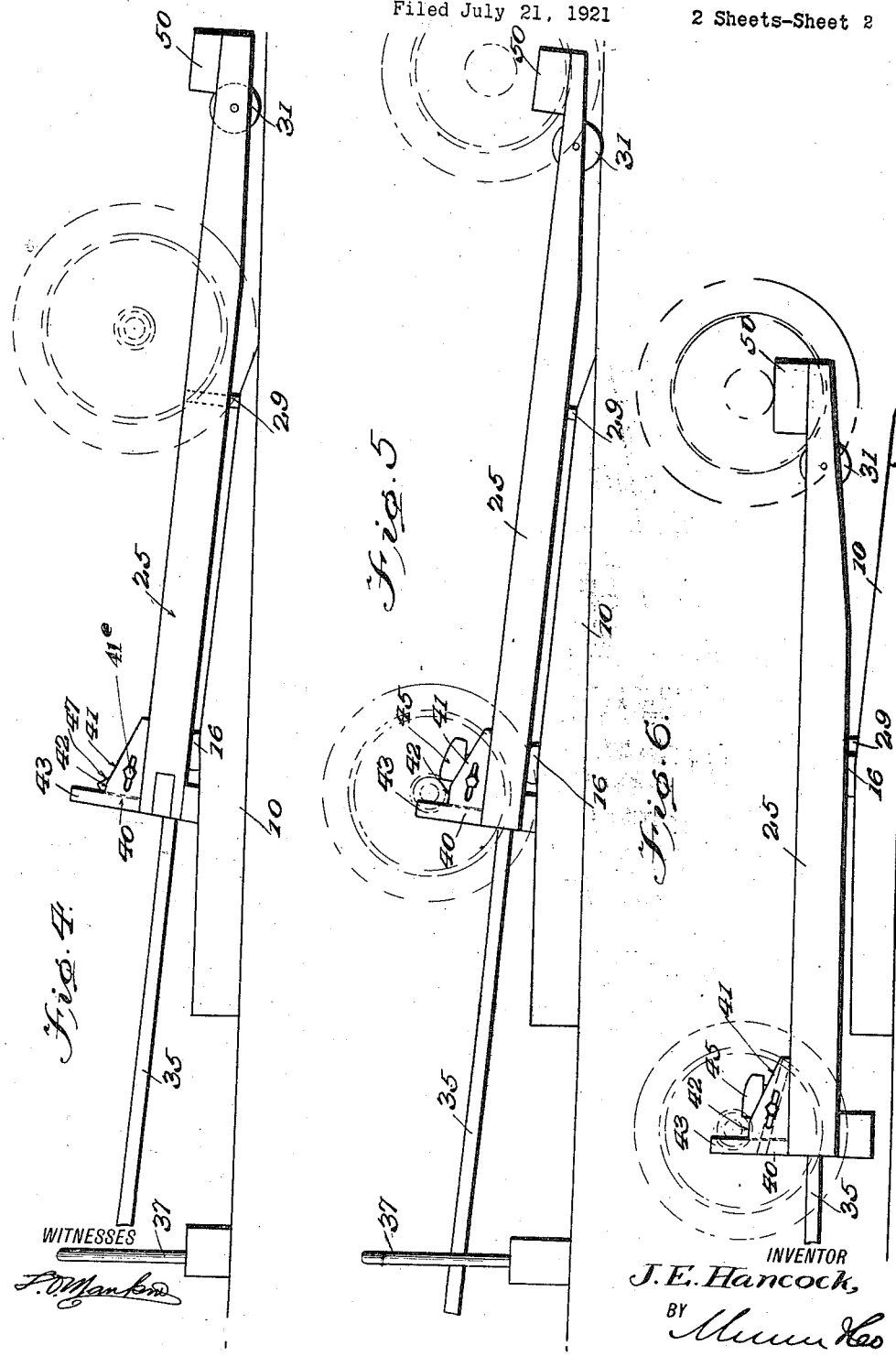

1,459,954

UNITED STATES PATENT OFFICE.

JOHN EDWARD HANCOCK, OF CHARLESTON, SOUTH CAROLINA.

SUPPORT FOR VEHICLES.

Application filed July 21, 1921. Serial No. 486,422.

*To all whom it may concern:*

Be it known that I, JOHN E. HANCOCK, a citizen of the United States, and a resident of Charleston, in the county of Charleston and State of South Carolina, have invented certain new and useful Improvements in Supports for Vehicles, of which the following is a specification.

The present invention relates in general to supports for vehicles, such as automobiles or the like and more particularly to an automatic automobile cradle or jack adapted to support the automobile with the wheels thereof out of contact with the ground when the automobile is in storage, being transported, or at other times when it is not in use.

The object of the invention is to provide an apparatus of this character which is automatic in that the automobile may be elevated and supported upon the cradle by simply running it onto the cradle under its own power, the automobile supplying the power necessary to actuate the cradle in the elevating operation.

Another object is to provide an apparatus of this character in which the automobile is readily and easily lowered with its wheels in engagement with the ground without the necessity of applying a great degree of power to the cradle or of providing elaborate control mechanism.

Another object of the invention is to provide an apparatus of this character which is of simple, durable and compact construction so as to be susceptible of use in the ordinary garage or in an ordinary box car, which is reliable and safe in operation and which is easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a plan view of an apparatus embodying the invention;

Figure 2 is a view thereof in longitudinal vertical section;

Figure 3 is a similar view in transverse vertical section;

Figure 4 is a side elevational view, illustrating the cradle in lowered position;

Figure 5 is a similar view illustrating the parts as positioned in the intial phase of the operation;

Figure 6 is a similar view, illustrating the parts as positioned in the final phase of the operation.

Referring to the drawings wherein for the sake of illustration is shown the preferred embodiment of the invention, it will be seen that the invention contemplates a base which is set upon the floor or ground and which includes sills 10 having inclines 11 presenting runways for the wheels of the vehicle, the lower end 12 of the inclines being at a greater angle than the main portions thereof to facilitate the travel of the vehicle wheels onto the inclines. At the ends of the sills opposite the lower end of the inclines inwardly extending blocks 14 are arranged and provide supports, as well as stops for the sills. A cross piece 16 extends between the sills 11 intermediate the ends thereof and terminates adjacent the inner side faces of the sills 12. Roller shafts 17 are journaled in the cross pieces and the sills as shown in Figure 3, thimbles 18 being inserted in the cross pieces and bushings 19 being inserted in the sills to provide proper journals for the roller shafts. Rollers 20 are mounted on the roller shafts 17.

A cradle or platform, designated generally at 25 is mounted on the base and includes side bars 26 which run on the rollers 20, end cross bars 27 and 28 extending between the side bars 26 and an intermediate cross bar 29. Adjacent the rear end of the cradle that is adjacent the end at which the cross bar 28 is located the side bars 26 are provided with slots 30 in which wheels 31 are arranged, the wheels being adapted to engage the ground in the lower position of the cradle. In the upper or elevated position of the cradle, the front cross bar 27 engages or rests upon the supports presented by the blocks 14.

Guiding mechanism is provided for the cradle and includes a swinging guide 35 which is held against lateral or longitudinal movement by means of a headed stud 36 connected with the cross piece 16 and which is constrained to proper swinging motion by means of the guide cage 37 arranged forwardly of the base. Guide openings 38 and 39 are provided in the cross bars 27 and 29 of the cradle and in these guide openings the swinging guide 35 operates whereby to constrain the cradle to its proper movement on the base.

A pair of front pedestals, designated generally at 40 are arranged on the side bars of the cradle at the forward end thereof. Each pedestal includes an incline 41, a support 42 and a stop lug 43. The front pedestals are adapted to be engaged by the front axles of the automobile, the inclines 41 first engaging the front axles and serve to facilitate travel of the axles onto the supports 42. When on the supports 42, these axles engage the stop lugs 43 which positively arrest further forward movement of the vehicle relative to the cradle thus constraining the cradle to partake of the forward motion of the vehicle.

Latch mechanism is associated with the pedestals 40 and includes a pivoted latch 45 having a shoulder 46 and a setting arm 47. The shoulders 46 are engageable with the axles of the automobile to hold these axles on the supports 42 when the latches are arranged in latching position and the setting arms 47 are initially engaged by the front axles to swing the latches up into latching position. Trips are associated with the latch mechanism and each include a pivot bar 48, the upper end of which is adapted to engage the under side of the pivoted latch to hold it in latching position. When the trip bar 48 has been turned or tripped so as to swing free of the latch 45, the latch falls by gravity to unlatching or release position. The trip bar 48 is itself so suspended as to be swung by gravity into engagement with the latch 45 to hold it in latching position and it is only tripped by engagement with one of the rollers 20 when the cradle is moved rearwardly into lower position.

A pair of pedestals 50 are carried by the side bars of the cradle at the rear end of the frame and includes supporting surfaces 51 adapted to engage the rear axle of the automobile when the cradle is shifted into elevated position.

In operation, when the cradle is not in use, it is positioned as shown in Figures 1, 2, 4 and 5. When it is desired to place a vehicle, such as an automobile, on the cradle, the automobile is run up on the runways 11 of the sills. The front wheels of the automobile travel up these runways and the front axle eventually engages the pedestals 40. This tilts or swings the cradle and at the same time imparts a forward rectilinear motion thereto. When the front axle of the vehicle engages the pedestals 40, the latches are disposed as shown in Figure 2 with the setting arms 47 thereof extending upwardly. As the front axle rides up the incline and onto the support it engages the setting arm so as to swing the setting arm downwardly and the latch upwardly whereby the shoulder 46 of the latch is engaged behind the front axle to confine it or hold it in position on the support 42 of the front pedestal. Then as the cradle moves forwardly the trip bar 48 is disengaged from the roller and swings by gravity until its upper end abuts the underside of the latch 45 to hold the latch in position. As the vehicle continues to travel on the runways presented by the sills the forward end of the vehicle is of course elevated and the cradle is advanced forwardly until the center of gravity of the automobile and the cradle is disposed forwardly of the rollers 20. At this time the front wheels of the automobile are just running off of the blocks 14 at the forward end of the sills so that the cradle takes the entire weight of the automobile at this time, the rear pedestals 50 engaging under the rear axles. The weight of the vehicle maintains the cradle and the vehicle in elevated position. During this action, the cradle has been constrained to partake of proper movement on the base by the action of the swinging guide 35 which cooperates with the guide openings 38 and 39 of the cross bars of the cradle. The cage 37 engages the forward end of the guide and confines it to its proper motion.

When it is desired to lower the automobile, or take it from the cradle the operator grasps the forward end of the swinging guide 35 that is he grasps the end thereof which projects beyond the cage 37 and lifts upwardly thereon. This tilts the cradle about the rollers 20 and the cradle begins to slide down on the rollers. As the rear end of the cradle approaches the ground the wheels 31 engage the ground and facilitate the progress or motion of the cradle. After the rear end of the cradle engages the ground the trips 48 are engaged by the rollers 20 and released to permit the latches to swing downwardly so as to release the automobile and permit it to ride down the runways and off of the cradle.

If desired the pedestals may be adjustable and any suitable means may be employed for this purpose. One form of adjustment means which may be employed is shown in conjunction with the front pedestals. In this arrangement each pedestal comprises a pair of sections $41^a$ and $41^b$, the section $41^a$ having an inclined rib $41^c$ operating in an inclined groove $41^d$ provided in the section $41^a$ and the sections being held in adjusted position by a nut and bolt $41^e$ the sections being suitably slotted to accommodate the bolt.

I claim:

1. In an apparatus of the character described, a base including sills having inclines presenting runways, blocks at the ends of said sills constituting supports, a cross piece, roller shafts journaled in said cross piece and said sills, rollers on said shafts, a cradle associated with said base and including side bars mounted on the rollers of the base, end cross bars and an intermediate cross bar, one of said end cross bars and said intermediate cross bar having guide openings, a swinging guide arranged on the cross piece of the base and cooperating with the guide openings of said cross bars, wheels carried by the side bars of the cradle, a pair of pedestals at one end of the cradle including inclines, supports and stops, latch mechanism associated with said pedestals and including pivoted latches, trips comprising pivoted trip bars, and a second pair of pedestals at the opposite ends of the cradle.

2. In an apparatus of the character described, a base including sills having inclines presenting runways, blocks at the ends of said sills constituting supports, rollers associated with the base, a cradle associated with said base and including side bars mounted on the rollers of the base, end cross bars and an intermediate cross bar, one of said end cross bars and said intermediate cross bar having guide openings, a swinging guide cooperating with the guide openings of said cross bars, wheels carried by the side bars of the cradle, a pair of pedestals at one end of the cradle including inclines, supports and stops, latch mechanism associated with said pedestals and including pivoted latches, trips comprising pivoted trip bars, and a second pair of pedestals at the opposite ends of the cradle.

3. In an apparatus of the character described, a base having runways for the wheels of the vehicle, rollers and supports, a cradle mounted on the rollers of the base for rectilinear and swinging movement and engageable with the supports in elevated position of the cradle, wheels carried by the cradle and engageable with the ground in the lower position of the cradle, guiding mechanism for constraining the cradle to movement on said runways, pedestals carried by the cradle and adapted to be engaged by the vehicle whereby movement is imparted to the cradle from the vehicle and other pedestals carried by the cradle and engageable with the vehicle in the elevated position.

4. In an apparatus of the character described, a base having runways for the wheels of the vehicle, rollers and supports, a cradle mounted on the rollers of the base for rectilinear and swinging movement and engageable with the supports in elevated position of the cradle, wheels carried by the cradle and engageable with the ground in the lower position of the cradle, pedestals carried by the cradle and adapted to be engaged by the vehicle whereby movement is imparted to the cradle from the vehicle and other pedestals carried by the cradle and engageable with the vehicle in the elevated position of the cradle.

5. In an apparatus of the character described, a base having runways for the wheels of the vehicle, rollers and supports, a cradle mounted on the rollers of the base and engageable with the supports in elevated position of the cradle, pedestals carried by the cradle and adapted to be engaged by the vehicle whereby movement is imparted to the cradle from the vehicle and other pedestal carried by the cradle and engageable with the vehicle in the elevated position of the cradle.

6. In an apparatus of the character described, a base having runways for the wheels of a vehicle and rollers, a cradle mounted on the rollers of the base, guiding mechanism for the cradle, pedestals at one end of the cradle including inclines, supports and stops, latch mechanism associated with said pedestals, trips cooperating with said latch mechanisms, and a second pair of pedestals at the other end of said frame.

7. In an apparatus of the character described, a base having runways for the wheels of a vehicle and rollers, a cradle mounted on the rollers of the base, pedestals at one end of the cradle, latch mechanism carried by said pedestals, trips cooperating with said latch mechanisms, and a second pair of pedestals at the other end of said frame.

8. In an apparatus of the character described, a base including rollers, a cradle mounted on the rollers of the base for swinging and rectilinear movement, and a swinging guide carried by the base and cooperating with the cradle for constraining it to proper motion on the rollers of said base.

9. In an apparatus of the character described, a base, a cradle mounted on the base, a pair of pedestals at one end of the cradle, latch mechanism associated with said pedestals including gravity controlled latches, trips comprising pivoted trip bars coacting with said latches and a second pair of pedestals arranged on said cradle in spaced relation to said first-named pairs of pedestals.

JOHN EDWARD HANCOCK.